Figure 13:
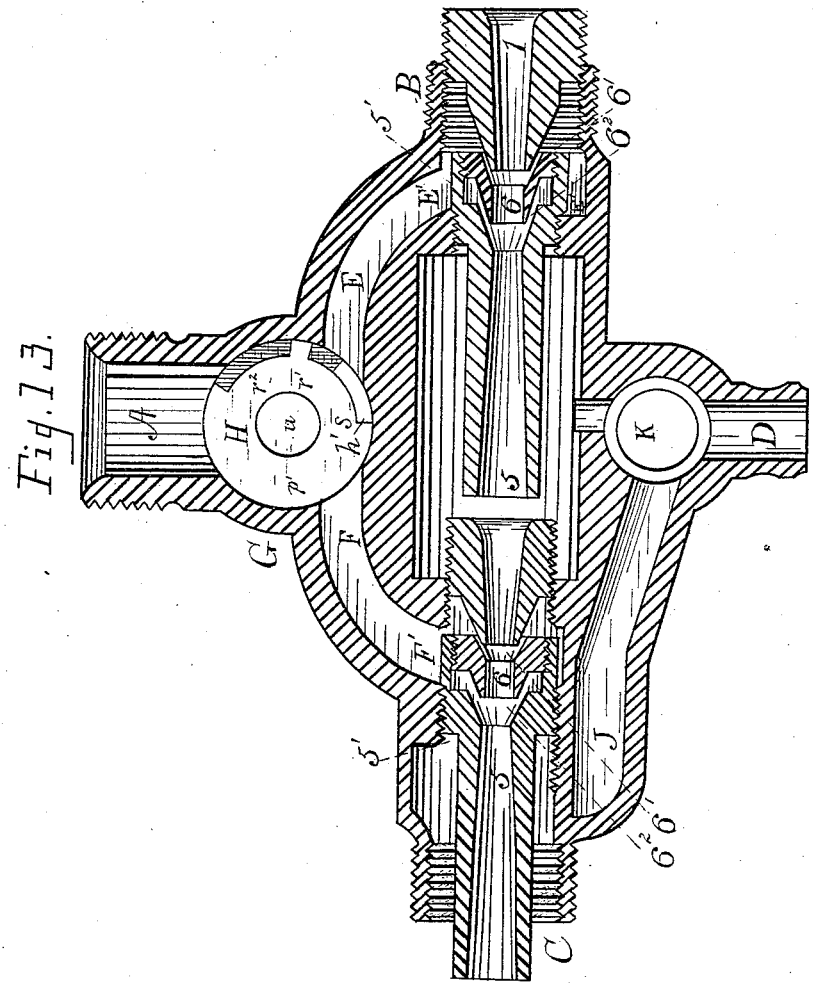

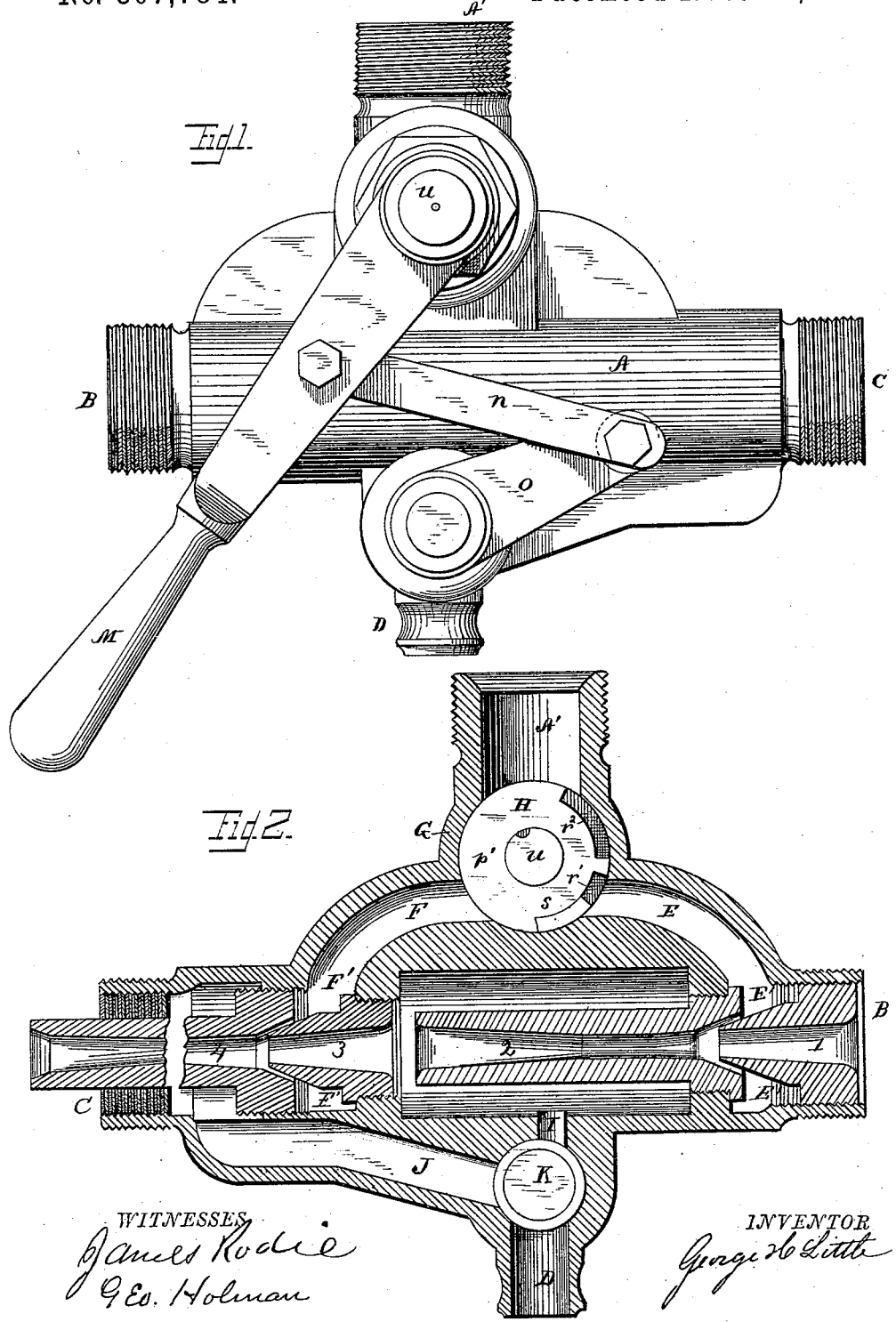

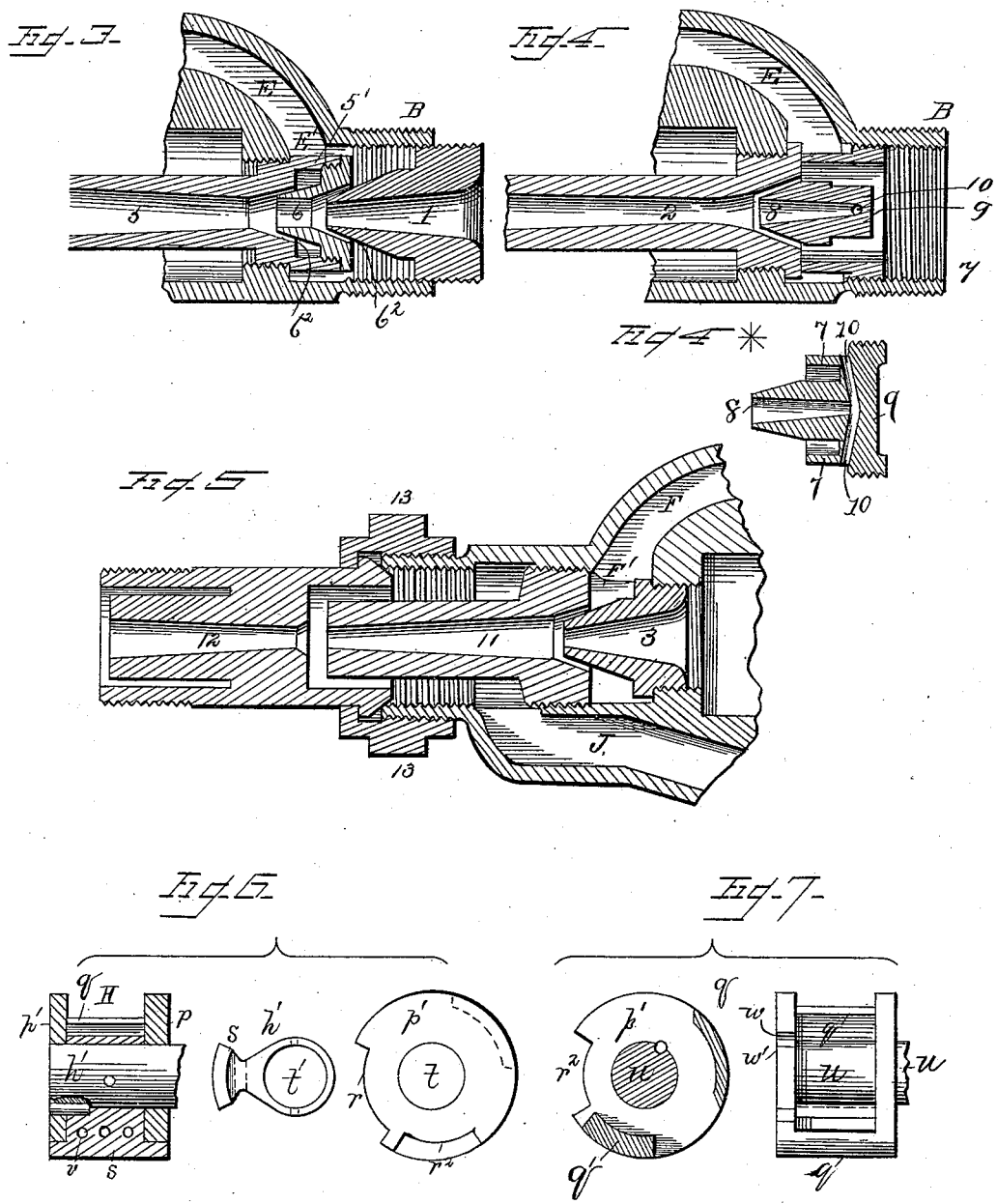

(Model.)
G. H. LITTLE.
COMBINED EJECTOR AND INJECTOR.
No. 307,784. Patented Nov. 11, 1884.
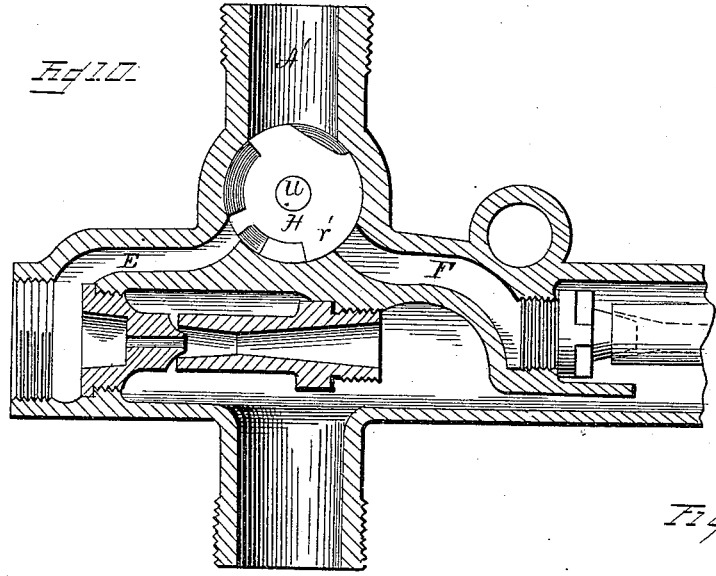
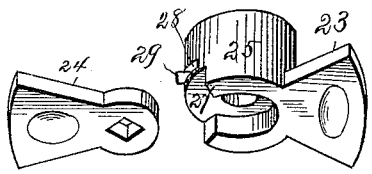
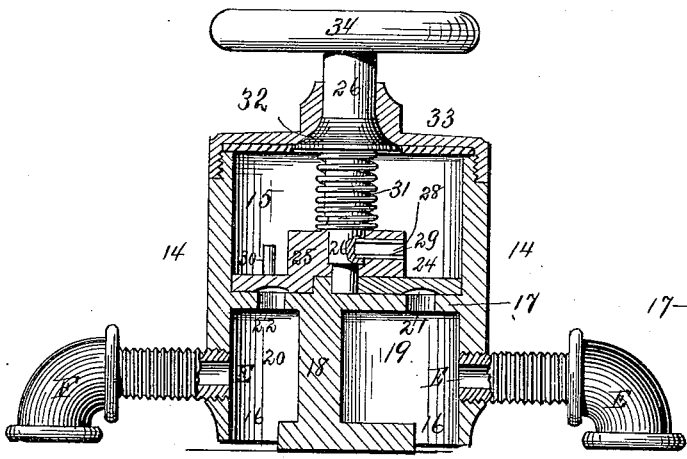
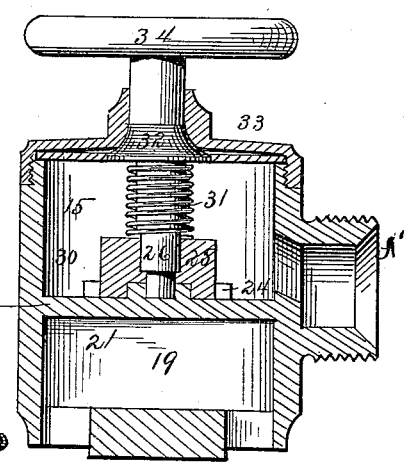
WITNESSES
James Rodie
Geo. Holman
INVENTOR
George H. Little

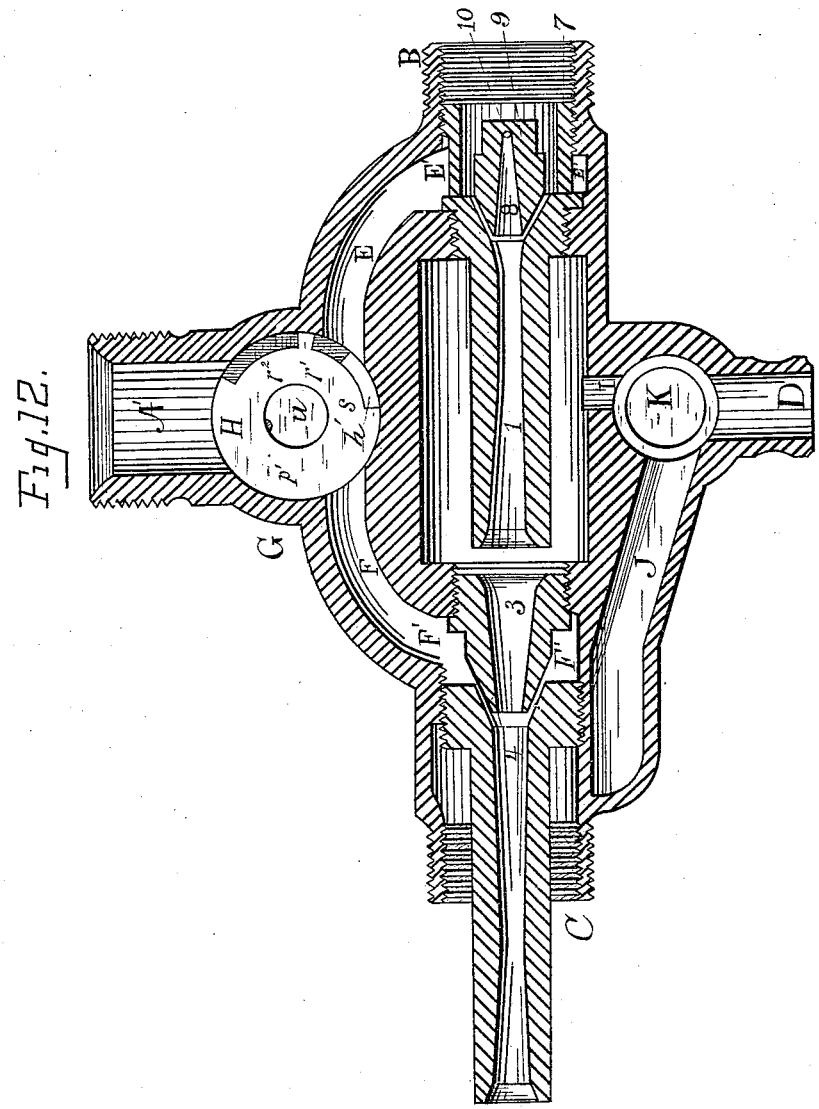

(Model.)

5 Sheets—Sheet 5.

G. H. LITTLE.
COMBINED EJECTOR AND INJECTOR.

No. 307,784.

Patented Nov. 11, 1884.

WITNESSES:
Percy White
G. L. DeMotte

INVENTOR:
George H. Little
by John J. Halsted & Son
his Attys

UNITED STATES PATENT OFFICE.

GEORGE H. LITTLE, OF PEABODY, MASSACHUSETTS.

COMBINED EJECTOR AND INJECTOR.

SPECIFICATION forming part of Letters Patent No. 307,784, dated November 11, 1884.

Application filed April 19, 1884. (Model.)

*To all whom it may concern:*

Be it known that I, GEORGE H. LITTLE, of Peabody, in the county of Essex and State of Massachusetts, have invented certain new and useful Improvements in Combined Ejectors and Injectors; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of apparatus in which two jets of steam are used— one for lifting and feeding the water, which is generally termed the "ejector," and the other for forcing the water which has been lifted and fed into a boiler or other receptacle, and which is generally termed the "injector." In combined ejectors and injectors which have heretofore been made the course of the water has been very indirect and crooked, thus causing great friction and retarding the speed of the water.

The leading objects of my invention are, first, to make the course of the water straight or direct, thus avoiding all or nearly all friction incident to a tortuous course; second, to made a combined ejector and injector in which may be used at option either solid jets or annular jets of steam for lifting or forcing, and in which the same inlet is used for steam and the same inlet for water, whether the jets be annular or solid; and, third, to have two valves in one case to be operated by one handle for admitting the steam into the ejector and injector at different times; and my invention embraces, also, certain details of construction, more particularly hereinafter described.

In the accompanying drawings, which illustrate my invention, Figure 1 is a front elevation of my combined ejector and injector. Fig. 2 is a longitudinal vertical section of the same. Figs. 3, 4, and 4* represent longitudinal sections of modifications of the ejector-tubes. Fig. 5 represents a longitudinal section of a modification of the injector-tubes. Fig. 6 represents the steam-inlet valve as made in two pieces. Fig. 7 are details of the steam-inlet valve as made in one piece. Figs. 8 and 9 are vertical sections of a modification of the valve and valve-seat, and Fig. 10 details of the valve; and Fig. 11 illustrates the double valve as applied to an ejector and injector of the kind patented to Felthouser and Valker, No. 283,229, August 14, 1883. Fig. 12 illustrates a modification of my combined ejector and injector having the ejector-tubes, as represented in Fig. 4, and the injector-tubes, as represented in Fig. 2; and Fig. 13 illustrates another modification having both the ejector and injector tubes, as represented in Fig. 3.

Similar letters represent like parts in all the figures.

A represents the shell or case of the combined ejector and injector.

A' is the steam-inlet, which may be connected to a steam-supply pipe by any suitable means.

B is the water-inlet.

C is the steam and water outlet to the boiler, tank, or other receptacle into which the water is to be forced.

D is the overflow-pipe for the water.

E is the port or passage leading from the steam-inlet to the ejector or water lifter and feeder.

F is the port or passage leading from the steam-inlet A' to the injector or water-forcer.

G is a cylindrical valve casing or seat for the steam-inlet valve or valves.

H $h'$ are the two valves or the two-part valve fitting in said seat. These two valves or two-part valve H $h'$ are combined so as to be operated by one handle, the larger one of which, H, rests snugly in the casing G. This valve H, which is the injector-valve, is made of two disks, $p$ and $p'$, joined together by the part $q$.

$r\ r'$ are corresponding arched notches in the peripheries of $p\ p'$, and $r^2$ is still another arched notch in the periphery of the disk $p'$, for a purpose hereinafter to be explained. The valve $h'$, which is the ejector-valve, is made in the shape of a cylinder, with an arched projection, $s$, upon it. When the two parts of the valve are joined together, the arched projection $s$ will fit into the notches $r\ r'$, but not quite filling them up, in order to leave a slight play for the projection $s$. The periphery of the projection $s$ will be a continuation of the peripheries of the disks, so that the curved surface of both valves will be continuous. The openings $t\ t'$ in both valves, respectively, will also correspond. The valve $h'$ may be secured to the shaft or spindle $u$ by means of a pin passing through holes in said part and shaft; but any well-known mechanical device—as, for instance, set-screws or keys—may be used for this purpose, and any appropriate device—as, for instance, racks, cams, levers, and wheels—may be used to operate said valve. The arched notch $r^2$ is adapted to have one or two pins from the casing A project into it, so as to limit the throw of the valve.

$v$ are small holes in the projection $s$ for a freer passage of the steam into the ports E and F. When one valve is used, (see Fig. 7,) $h'$ is dispensed with, also the notches $r\ r'$ in the disks $p\ p'$, a connection, $q'$, similar to $q$ being used in place of the arched projection $s$ for closing the port E.

$w\ w'$ are corresponding notches in the disk $p'$ and the end of the shaft $u$ to admit a pin or key for keying the valve and shaft together.

1 is the water-inlet tube, and 2 is the ejector or water-lifting tube.

3 is the injector steam and water tube, and 4 is the injector combining or water-forcing tube. The tube 1 has a tapering or conical passage longitudinally through it, and it is also conical or tapering externally. This tube is secured in the water-inlet B, and its smaller or internal end projects into the flaring mouth of the lifting and commingling tube 2, leaving an annular space between them. The passage in the tube 2 leading from its mouth tapers or contracts to about its center, and then gradually enlarges to its other extremity.

The forcing or injector tubes 3 and 4 are of similar construction to the ejector-tubes, the tube 3 being similar to the tube 1, and the tube 4 being similar to the tube 2. The tube 3 is so placed in the casing that its inlet is a short distance from the outlet of the tube 2. The steam-ports E and F are so extended that there are annular chambers E' F' around the tubes 1 and 3, respectively.

I is a waste passage or port leading from the ejector to the overflow, and J is another passage leading from the injector to the overflow.

K is an ordinary cock or double valve for opening and closing the ports I and J.

M is a handle, which is securely fastened upon the shaft $u$, and which operates the two valves H $h'$. This handle is connected by a link, $n$, to the crank $o$, for operating the overflow-valve K, as shown in the drawings; or both valves may be operated separately. The steam enters the inlet A' and the water the inlet B, passing through the tube 1. The steam-ports E and F having been closed by the parts $s$ and $q$, respectively, of the valves, the handle M is then turned just far enough so that the part $s$ of the valve $h'$ will open the port E, and thus allows the steam to pass along said port to the annular chamber E' of the ejector, then pass around the outlet of the tube 1, between said tube and the flaring mouth of the tube 2, when the steam will enter said tube in an annular jet around the solid jet of water, thus lifting said water, commingling with it in the tube 2, and carrying it along said tube to the entering injector-tube 3. The handle N is then turned a little farther, when the port F will be opened by the part $q'$ of the valve $h'$, and the steam from the inlet A' will then pass through said port to the annular chamber F' of the injector, then pass around the outlet of the tube 3, between said tube and the flaring mouth of the tube 4, when the steam will enter said tube in an annular jet around the solid jet of mixed steam and water which has been carried along from the ejector-tube 2, and force or inject the same through the tube 4 into the boiler or other receptacle.

Instead of the ejector-tube 2 being made as above described, it may be made, as shown in Fig. 3, in two parts, 5 and 6, the part 5 having a skeleton frame, 5', at its entrance end in which the part 6 is screwed. The part 6 has a short conical tube, tapering externally and internally, leaving an annular space around the outlet of said tube and between it and the flaring mouth of the tube 5. The ends of the tubes 5 and 6 should be a slight distance apart. This form of injector-tube will admit of two annular jets of steam, one entering the inlet 6' of the part 6, between it and the tube 1, and the other jet entering the skeleton frame 5' and the annular space $6^2$ between the parts 5 and 6. I prefer to use a skeleton frame, 5', to receive the tube 6; but other forms may be used so long as an annular space is left around the tube 6 to admit steam.

Instead of the tube 1 being made as above described so as to have annular jets of steam for lifting the water, I may make it as represented in Fig. 4.

7 is a large tube or cylinder, open at both ends, and in which is secured a small tube, 8, by a cross-piece, 9. This tube 8 is closed at its outer end, but has inlet openings or ports, 10, from the outer periphery of the tube 7 through the cross-piece 9. This device is screwed into the water-inlet B, so that the inner end of the tube 7 will rest upon and form a steam-tight joint with the inlet end of the tube 2, or arranged so as to make a steam-tight joint across the port E, so that steam can only be admitted through the ports 10 and out through the tube 8. The externally-tapering end of the tube 8 will project into the mouth of the tube 2 similarly to the tube 1. The jet of steam in this case will be solid, entering the ports 10 from the annular chamber E', thence into and through the tube 8 into the tube 2. The jet of water will be direct but annular as it passes through the cylinder 7 around the tube 8, then into the tube 2 around the tube 8, and the steam entering the tube 2. The jet of steam will be solid.

Similar tubes to those above described may be used in place of the injector-tubes 3 and 4.

Instead of the injector combining-tube 4 being in one piece, as above described, it may be made in two pieces, as shown in Fig. 5. The outlet end of the combining part 11 does not quite reach to the inlet end of the discharge-part 12. The inner end of the discharge-tube 12 rests against the steam and water outlet C of the casing, and is held in place by the nut 13.

The waste or overflow cock K may either be operated by the same handle M as turns the steam-valve through the link n, or it may be operated separately and said link dispensed with.

Figs. 8 and 9 represent a modification of the steam-valve H h', in which the valve-seat and valve are flat instead of being cylindrical. The cylinder 14 is divided into two chambers, 15 and 16, by the diaphragm 17, which forms the flat seat of the steam-valve. The lower chamber, 16, is also divided by a partition, 18, at right angles to the diaphragm 17, dividing said lower chamber into two ports, 19 and 20. 21 and 22 are holes or ports in the diaphragm 17 leading from the steam-inlet A' into the ports or passages E F. The partition 18 will prevent the steam from passing from one of the passages E or F into the other. In this modification the steam-inlet A' is on one side of the casing, instead of being on top of the same, as in Figs. 1 and 2.

The two parts 23 and 24 of the valve are made in the form of sectors, the larger one, 23, having a central cylindrical portion, 25, through which the shaft 26 passes, and a recess, 27, for the admission of the central portion of the smaller sector 24, the outer portion of said recess being made a little larger than the narrowest width of the sector 24, to allow of a slight radial play of the same. The sector 24 has a square hole in it, to admit the shaft 26, but it may be keyed, if desired. The cylindrical part 25 of the sector 23 has a slot or opening, 28, through which passes a pin, 29, into the shaft 26. This pin and slot limit the play of the sector 24 upon the sector 23.

30 are pins secured in the diaphragm 17, to limit the play of the entire valve upon its seat.

31 is a coil-spring encircling the shaft 26, and held between the valve and the projection 32, which is a ground-joint, and forms a packing for the shaft or spindle 26, and which spring serves to keep said valve in place when the cover or cap 33 is screwed upon the case. The shaft or spindle 26 and the valve may be turned by a wheel, 34, or by a handle.

It will readily be seen that I avail myself of the advantage due to the straight course of water through the ejector and injector, whether the current of steam be solid or annular, and that I have shown the two valves in one case and operated by one handle or wheel applied to both solid and annular jet ejectors and injectors.

The tubes and valves hereinbefore described are applicable to any style or form of combined ejector and injector.

The valves which are described as "steam-valves" for an ejector and injector are applicable to an overflow-valve in a combined ejector and injector.

What I claim as new, and desire to secure by Letters Patent, is—

1. An ejector with an annular jet or jets of steam attached to an injector carrying an annular jet or jets of steam arranged in line, in combination with a valve so constructed that they may be worked independently or together, substantially as shown.

2. An annular jet-ejector communicating with a well or other water-supply, and an annular jet-injector connected with a boiler, both operated by a single or two-part valve, substantially as set forth.

3. A cylindrical or flat-seated valve or valves in one case, and operated by a hand wheel or lever, to admit steam to the ejector or injector, the water-inlet being at the end of the ejector, and the parts arranged so that the water may have a straight course, substantially as set forth.

4. A combined ejector and injector in which the water enters at one end, and in which the ejector and injector tubes are arranged in such a manner in line that the water has a straight passage through them whether they be solid or annular jets, and the steam-jets controlled by one valve, substantially as described.

5. In a combined ejector and injector, the combination of an ejector carrying two annular jets of steam in line one in advance of the other around the solid jet of water with an injector carrying two annular jets of steam placed in the same manner around the solid jet of water, substantially as shown and described.

6. In a combined ejector and injector, the combination of an ejector carrying a solid jet of steam within an annular jet of water with an injector carrying a solid jet of steam within an annular jet of water, the water entering at the end of the ejector, all substantially as shown and described.

7. In a combined ejector and injector, the combination of an ejector carrying a solid jet of steam within an annular jet of water with an injector carrying an annular jet of steam around a solid jet of water, the steam-nozzle constructed substantially as shown, and all arranged so that the water and steam have a straight course, the water entering at the end of the ejector, substantially as described.

8. In a combined ejector and injector, the combination of an ejector carrying an annular jet of steam around a solid jet of water with an injector carrying a solid jet of steam within an annular jet of water, substantially as described.

9. In a combined ejector and injector in which the water enters at the end and has a straight course from its entrance to its discharge, the combination of the water-inlet and lifting-tube of the ejector with the tube 3 and the combining and discharge tubes 11 and 12 of the injector, whereby the water passing through said combining-tube will form a vacuum between the same and the discharge-tube, and at the overflow J, substantially as shown.

10. In a combined ejector and injector admitting water at the end of the ejector, and having a straight or direct course for the water, a valve for admitting steam to the ejector or injector at will, substantially as described.

11. In a combined ejector and injector, the two valves or two-part valve H h', made substantially as described, and operated by a lever or levers, and whereby steam may be admitted to the ejector or injector at will.

12. In combination with a valve, K, and the ports I J, the valves H h', and the ports E F, in a combined ejector and injector, substantially as shown.

13. A combined ejector and injector in which the water-inlet of the ejector is at one end and the discharge-outlet of the injector at the other end of the case, and having a valve or valves operated by a single handle to control the steam both to the ejector and injector, so that the water shall have a straight course through the injector into the pipes leading to the boiler or other receptacle, substantially as shown and described.

14. A combined ejector and injector in which annular jets of steam are used both in the ejector and injector, and in which the admission of said jets is controlled by a valve in the same casing, and operated by a wheel or lever, substantially as shown and described.

15. A combined ejector and injector which has annular jets of steam in the ejector and a solid jet in the injector, substantially as described.

16. A combined ejector and injector which has annular jets of steam in the injector and a solid jet in the ejector, substantially as described.

17. In a combined ejector and injector, the combination of the steam-inlet A', valve H h', ports E and F, water-inlet B, ejector and injector tubes 1 2 3 4, discharge-outlet C, and overflow D, arranged opposite the steam-inlet A', with ports, or their equivalent, I J, all substantially as shown and described.

18. A combined ejector and injector constructed, substantially as described, so that the water always enters at the inlet B at the end of the ejector, and the steam through the passage or port E of the ejector, whether the jets of steam and water be solid or annular, and with a valve or valves to control the supply of steam to the ejector and injector.

GEORGE H. LITTLE.

Witnesses:
   JAMES RODIE,
   GEO. HOLMAN.